US010958982B1

(12) United States Patent
Ghose et al.

(10) Patent No.: US 10,958,982 B1
(45) Date of Patent: Mar. 23, 2021

(54) CLOSED-CAPTION PROCESSING USING MACHINE LEARNING FOR MEDIA ADVERTISEMENT DETECTION

(71) Applicant: Alphonso Inc., Mountain View, CA (US)

(72) Inventors: Susmita Ghose, Mountain View, CA (US); Sartaki Sinha Roy, West Bengal (IN)

(73) Assignee: ALPHONSO INC., New York, NY (US)

( * ) Notice: Subject to any disclaimer, the term of this patent is extended or adjusted under 35 U.S.C. 154(b) by 0 days.

(21) Appl. No.: 17/025,498

(22) Filed: Sep. 18, 2020

(51) Int. Cl.
| | |
|---|---|
| *H04N 21/488* | (2011.01) |
| *G06K 9/00* | (2006.01) |
| *H04N 21/81* | (2011.01) |
| *G06F 40/279* | (2020.01) |
| *H04N 21/845* | (2011.01) |

(52) U.S. Cl.
CPC ....... *H04N 21/4884* (2013.01); *G06F 40/279* (2020.01); *G06K 9/00718* (2013.01); *G06K 9/00765* (2013.01); *H04N 21/812* (2013.01); *H04N 21/8456* (2013.01)

(58) Field of Classification Search
CPC ............. H04N 21/4884; H04N 21/812; H04N 21/8456; G06K 9/00718; G06F 40/279
See application file for complete search history.

(56) References Cited

U.S. PATENT DOCUMENTS

| | | | | |
|---|---|---|---|---|
| 10,223,616 | B1 * | 3/2019 | Malin | G06N 3/08 |
| 10,489,496 | B1 * | 11/2019 | Sen | H04N 21/4882 |
| 10,706,286 | B1 | 7/2020 | Muhamed et al. | |
| 10,834,436 | B2 * | 11/2020 | Smith | H04N 21/235 |
| 2006/0245724 | A1 * | 11/2006 | Hwang | H04N 21/44008 |
| | | | | 386/241 |

(Continued)

OTHER PUBLICATIONS

Devlin et al., "Pre-training of Deep Bidirectional Transformers for Language Understanding," Proceedings of NAACL-HLT. pp. 4171-4186 (2019).

(Continued)

*Primary Examiner* — Nnenna N Ekpo
(74) *Attorney, Agent, or Firm* — Panitch Schwarze Belisario & Nadel LLP

(57) ABSTRACT

A method is provided to identify whether video content, which includes a plurality of image frames, is likely to include an advertisement. The video content is split into a plurality of segments, each segment having a pre-specified duration. Subtitle text information is extracted from each segment and is passed through a natural language processing (NLP) language model to extract an embedding representing the subtitle text information for each of the segments, wherein the NLP language model is previously trained to differentiate between subtitle text information from video content items that were each previously identified as being an advertisement in comparison to subtitle text information from video content items that were each previously identified as not being an advertisement. The embedding representing the subtitle text information for each of the segments is passed through a classifier to obtain a probability regarding whether each segment is an advertisement or not.

8 Claims, 8 Drawing Sheets

(56) References Cited

U.S. PATENT DOCUMENTS

| | | | | |
|---|---|---|---|---|
| 2010/0217671 | A1* | 8/2010 | Lee | H04N 21/812 |
| | | | | 705/14.53 |
| 2016/0037232 | A1* | 2/2016 | Hu | H04N 21/8455 |
| | | | | 725/34 |
| 2016/0112761 | A1* | 4/2016 | Venkataraman | H04N 21/252 |
| | | | | 725/14 |

OTHER PUBLICATIONS

Hauptmann et al., "Story segmentation and detection of commercials in broadcast news video," ADL-98 Advances in Digital Libraries Conference, Santa Barbara, CA, pp. 168-179, 10.1109/ADL.1998.670392 (1998).

He et al., "Deep Residual Learning for Image Recognition," pp. 770-778, CVF, 10.1109/CVPR.2016.90 (2016).

Howard et al., "Universal Language Model Fine-tuning for Text Classification," pp. 328-339, Proceedings of the 56th Annual Meeting of the Association for Computational Linguistics (Long Papers), 10.18653/v1/P18-1031 (2018).

Kim, Y., "Convolutional Neural Networks for Sentence Classification," Proceedings of the Conference on Empirical Methods in Natural Language Processing, pp. 1746-1751 (2014).

Loria, S., TextBlob: Simplified Text processing, downloaded from web page: <https://github.com/sloria/TextBlob>, download date: Sep. 9, 2020, original posting date: unknown but prior to 2020, 3 pages.

Lund et al., "Producing high-dimensional semantic space from lexical co-occurence," Behavior Research Methods Instruments & Computers, vol. 28, pp. 203-208 (1996).

Merity et al., "Regularizing and Optimizing LSTM Language Models," 10 pages (2017).

Mikolov et al., "Efficient Estimation of Word Representations in Vector Space," Proceedings of Workshop at ICLR, arXiv:1301.378av3, 12 pages (2013).

Mou et al., "How Transferable are Neural Networks in NLP Applications?," arXiv preprint; arXiv:1603.06111 (2016).

Pennington et al., "Glove: Global Vectors for Word Representation," EMNLP, vol. 14, pp. 1532-1543 (2014).

Peters et al., "Deep contextualized word representations," arXiv:1802.05365v2 [cs.CL], 15 pages (2018).

Radford et al,, "Improving Language Understanding by Generative Pre-Training," pp. 1-12 (2018).

Radford et al., "Language Models are Unsupervised Multitask Learners," 24 pages (2018).

Ramesh et al., "A Text-based Method for Detection and Filtering of Commercial Segments in Broadcast News," pp. 2107-2110.

Rao et al., "Actionable and Political Text Classification using Word Embeddings and LSTM," arXiv:1607.02501v2, 9 pages (2016).

Sennrich et al., "Neural Machine Translation of Rare Words with Subword Units," Proceedings of the 56th Annual Meeting of the Association for Computational Linguistics, pp. 1715-1725, 10.18653/v1/P16-1162 (2016).

SpaCy "Industrial-strength Natural Language Processing in Python." Downloaded from web page: <https://spacy.io>, download date: Oct. 20, 2020, original posting date: unknown.

Szegedy et al., "Going deeper with convolutions," The IEEE Conference on Computer Vision and Pattern Recognition( CVPR), pp. 1-9, 10.1109/CVPR.2015.7298594 (2015).

Taboada et al., "Lexicon-Based Methods for Sentiment Analysis," Computational Linguistics, vol. 37, pp. 267-307, 10.1162/COLI_a_00049 (2011).

Vaswani et al., "Attention Is All You Need," 31st Conference on Neural Information Processing Systems (NIPS 2017), 15 pages(2017).

Wu et al., "Google's Neural Machine Translation System: Bridging the Gap between Human and Machine Translation," pp. 1-23, arXiv:1609.08144v2 [cs.CL] (2016).

Zhu et al., "Aligning books and movies: Towards story-like visual explanations by watching movies and reading books;" In Proceedings of the IEEE International Conference on Computer Vision, pp. 19-27 (2015).

Zhu et al., "Classification of TV programs based on audio information using hidden Markov model," pp. 27-32, 10.1109/MMSP.1998.738908 (1999).

* cited by examiner

```
1
00:00:00,550 --> 00:00:01,784
    <i> Back then, we checked our</i>
            <i> smartphones</i>

2
00:00:01,819 --> 00:00:03,152
        <i> zero times a day.</i>

3
00:00:03,187 --> 00:00:05,120
    <i> Times change. Eyes haven't.</i>

4
00:00:05,156 --> 00:00:06,488
    <i> That's why there's Ocuvite.</i>

5
00:00:06,524 --> 00:00:07,322
        <i> Screen light...</i>

6
00:00:07,358 --> 00:00:07,790
        <i> Sunlight...</i>

7
00:00:07,825 --> 00:00:08,791
        <i> Longer hours...</i>

8
00:00:08,826 --> 00:00:10,592
    <i> Eyes today are stressed!</i>

9
00:00:10,628 --> 00:00:12,094
        <i> But Ocuvite has vital</i>
            <i> nutrients</i>

10
00:00:12,129 --> 00:00:13,262
        <i> to help protect them.</i>

11
00:00:13,297 --> 00:00:13,862
            <i> Ocuvite.</i>

12
00:00:13,898 --> 00:00:13,962
    <i> Eye nutrition for today.</i>
```

Figure 2

Back then, we checked our smartphones zero times a day. Times change. Eyes haven't. That's why there's Ocuvite. Screen light... Sunlight... Longer hours... Eyes today are stressed! But Ocuvite has vital nutrients to help protect them. Ocuvite. Eye nutrition for today.

START
↓
802 — Provide a curated database of video content items that includes (i) a plurality of different video content items that were each previously identified as being an advertisement, and (ii) a plurality of different video content items that were each previously identified as not being an advertisement
↓
804 — Split each of the video content items into a plurality of segments, each segment having a pre-specified duration
↓
806 — Extract subtitle text information from each segment
↓
808 — Train a NLP language model to differentiate between subtitle text information from video content items that were each previously identified as being an advertisement in comparison to subtitle text information from video content items that were each previously identified as not being an advertisement
↓
810 — Pass the subtitle text information for each segment through the NLP language model to extract an embedding representing the subtitle text information for each of the segments
↓
812 — Pass the embedding representing the subtitle text information for each of the segments through a classifier to obtain a probability regarding whether each segment of the video content is an advertisement or not
↓
END

Figure 8

CLOSED-CAPTION PROCESSING USING MACHINE LEARNING FOR MEDIA ADVERTISEMENT DETECTION

BACKGROUND OF THE INVENTION

Precise detection of advertisements (ads) in a video (TV) stream is of paramount importance for companies in the field of TV analytics and measurement, partly because it allows for accurate downstream analysis. Whether the task is to provide audience engagement, deeper insights into consumer behavior and attribution, or to solidify automated content recognition and categorization, accurate and automated ad detection is a very important first step.

Conventional approaches to ad detection rely largely on feature extraction from audio and video. One prior art approach that uses closed captions to detect commercials is described in Ganesh Ramesh, Amit Bagga: "A Text-based Method for Detection and Filtering of Commercial Segments in Broadcast News," 2002. However, this approach is based on a simple similarity measure within words in the captions, and does not generalize very well.

Accordingly, there is an unmet need for improved systems and methods that use closed caption text for performing advertisement (ad) detection in a video stream, and more specifically, to perform ad vs non-ad classification. The present invention fulfills this need.

SUMMARY OF THE PRESENT INVENTION

A method is provided to identify whether video content, which includes a plurality of image frames, is likely to include an advertisement. The video content is split into a plurality of segments, each segment having a pre-specified duration. Subtitle text information is extracted from each segment and is passed through a natural language processing (NLP) language model to extract an embedding representing the subtitle text information for each of the segments, wherein the NLP language model is previously trained to differentiate between subtitle text information from video content items that were each previously identified as being an advertisement in comparison to subtitle text information from video content items that were each previously identified as not being an advertisement. The embedding representing the subtitle text information for each of the segments is passed through a classifier to obtain a probability regarding whether each segment is an advertisement or not.

BRIEF DESCRIPTION OF THE DRAWINGS

Preferred embodiments of the present invention will now be described by way of example with reference to the accompanying drawings:

FIG. 2 is a captions file for illustrating features of the present invention.

FIG. 3 shows the final text which is obtained after preprocessing the captions file of FIG. 2.

FIGS. 7-9 illustrate flowcharts for preferred embodiments of the present invention.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

1. MODEL ARCHITECTURE

Figure 1:
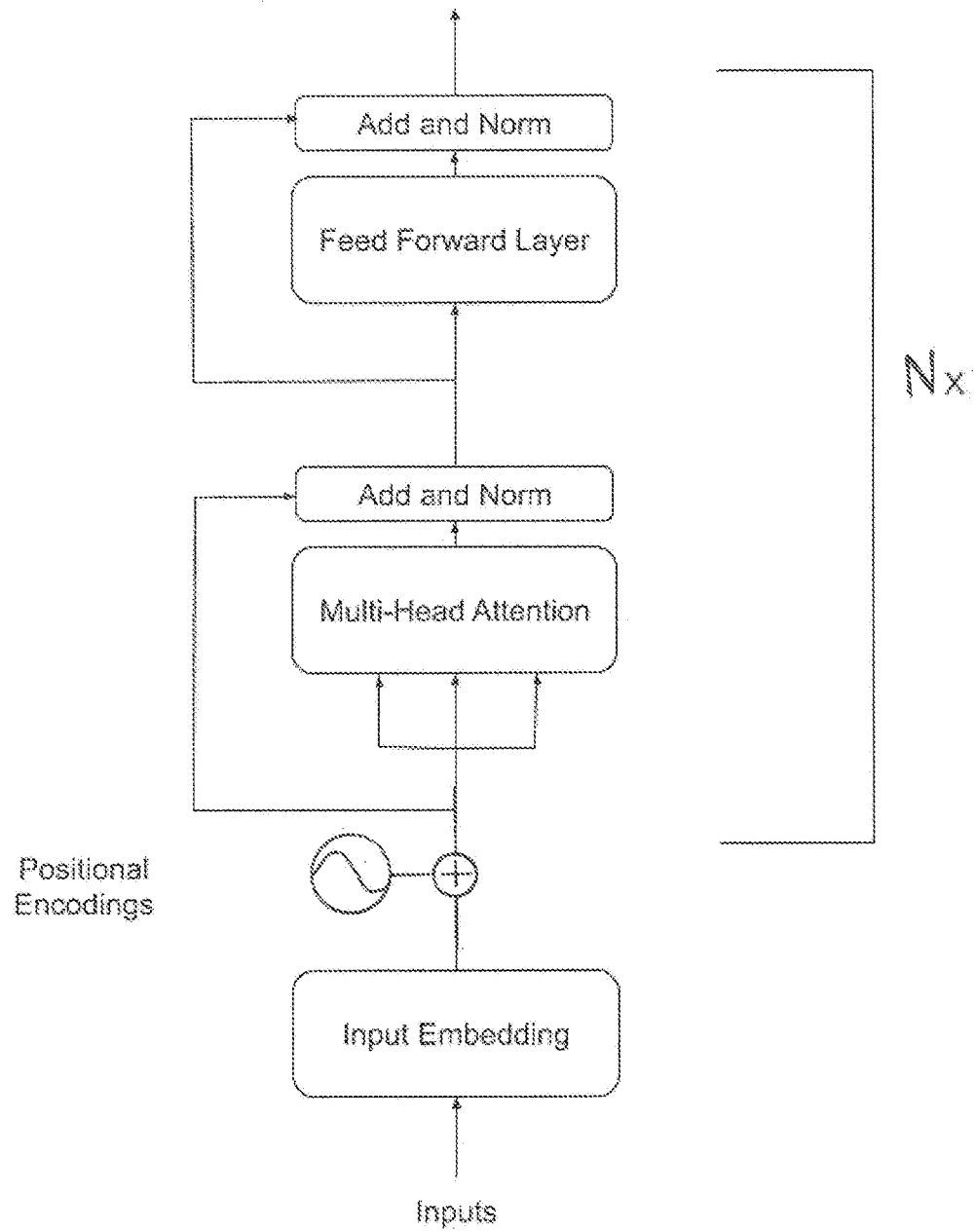
FIG. 1 illustrates an encoder Transformer architecture used in one preferred embodiment of the present invention.

FIG. 1 shows an encoder Transformer architecture used in one preferred embodiment of the present invention. More specifically, FIG. 1 shows the encoder Transformer architecture used in the BERT (Bidirectional Encoder Representations from Transformers) model. In the BERT model, every token can attend to the contexts on both sides of a sequence. Here Nx represents the number of layers or the transformer blocks, and the hidden state of each Transformer block serves as an input of the block just after it. The output of the final Transformer block can be used for the downstream tasks. A special classification token, [CLS] is added as the first token to every classification sequence, and the hidden state of the last Transformer layer corresponding to this token is used as the representation of the sequence. This sequence embedding is then passed through a fully connected (FC) layer which outputs the probability of a clip (video segment) being a non-ad or ad. Additionally, one may extract this sequence embedding for use in integrated applications such as combining the outputs of this model with another machine learning model to increase accuracy.

The Open AI GPT Transformer uses constrained self-attention where every token can only attend to context to its left, unlike BERT where a token attends to context on both sides. There are two different variants of the BERT models with different sizes that are suitable for use in the present invention:

i. BERTBASE: L=12, H=768, A=12, Total Parameters=110M ii. BERTLARGE: L=24, H=1024, A=16, Total Parameters=340M wherein L denotes the number of layers or the Transformer blocks (denoted by Nx in FIG. 1), the hidden size is denoted by H, and the number of self-attention heads is denoted by A. In all cases the feed-forward/filter size was set to be 4H, i.e., 3072 for the H=768 and 4096 for the H=1024.

The input words are embedded with WordPiece embeddings with a 30,000 token vocabulary. Also, the relative position of the words in the sequence is encoded by previously learned positional embeddings with supported sequence lengths up to 512 tokens. The model is trained on two different tasks, Masked Language Model (MLM) and Next Sentence Prediction. Standard Language model are unidirectional, i.e., they are trained only from left-to-right or right-to-left, hence autoregressive. Thus, the representations of a word captures the context only to its left or right. Intuitively, the representation learned from the context on both sides of a word is more powerful. Masked Language Model, a variant of standard Language model is used where 15% of the words in each sentence (training sample) are masked at random, i.e., replaced by token "[MASK]". The model is then trained as an autoencoding model to predict these masked words using the words in a window spanning on both sides on the masked token, thus forcing the model to learn the context on both sides of the word, thereby making it deeply bidirectional. Many important downstream tasks such as Question Answering (QA) and Natural Language Inference (NLI) are based on understanding the relationship between two text sentences, which is not directly captured by language modeling. In order to train a model that understands sentence relationships, pretraining was done on a binarized next sentence prediction task that is generated from the corpus. The "BASE" version of the model was as an acceptable tradeoff between the performance and the resources/time needed during the training and inference.

2. DATASET AND PREPROCESSING

One suitable implementation of the present invention uses approximately 5k captioned ad clips and 5k captioned non-ad clips of 10-15 seconds duration. The non-ad clips were obtained by concatenating live streams from ad-clipper machines, and then using the PySceneDetect package to create segments. These were then manually curated and split to have a duration of 10-15 seconds. The ad clips were obtained from commercial databases and further split into clips of 15 seconds. The captions are extracted from these clips using CCextractor, an open-source project for extracting subtitles from TV recordings. The resultant SubRip Subtitle (SRT) file is then parsed to obtain the final captions. An SRT file is a plain-text file that contains subtitle information. An SRT file is thus a type of captions file. The file include starts and stop times next to the subtitle text, thereby ensuring that the subtitle information will be displayed at exactly the right time in the video.

FIG. 2 shows an example of an SRT file extracted from an ad clip using CCextractor. The SRT file is then parsed to extract the captions in the clip. These captions are then concatenated and preprocessed using some common text cleaning techniques used in NLP as follows:

i. Tabs, newlines etc. are normalized by replacing them with spaces
  ii. All the HTML tags are filtered out
  iii. Multiple spaces are normalized to have a single space
  iv. Music symbols processed to be represented by "[Music]" token The final text which is obtained after applying the preprocessing techniques is used by the model.

FIG. 3 shows the final text which is obtained after preprocessing the parsed captions from the SRT file in FIG. 2.

3. TRAINING

In one training example approximately 2,500 ad clips and non-ad clips were used to obtain the test set. The remaining data was used to create the training set (70%) and validation set (30%). The model was trained on the training set and the validation set was used to tune the hyperparameters of the model. The model was trained for 1,500 steps with a batch size of 32 and learning rate of 10'. The Adam optimization algorithm was used for the mini batch gradient descent. A drop out with keep probability of 805 was added to the final layer before the softmax. This was repeated five times to reduce the effect of any sampling bias and obtain a stable performance metrics.

Figure 4:
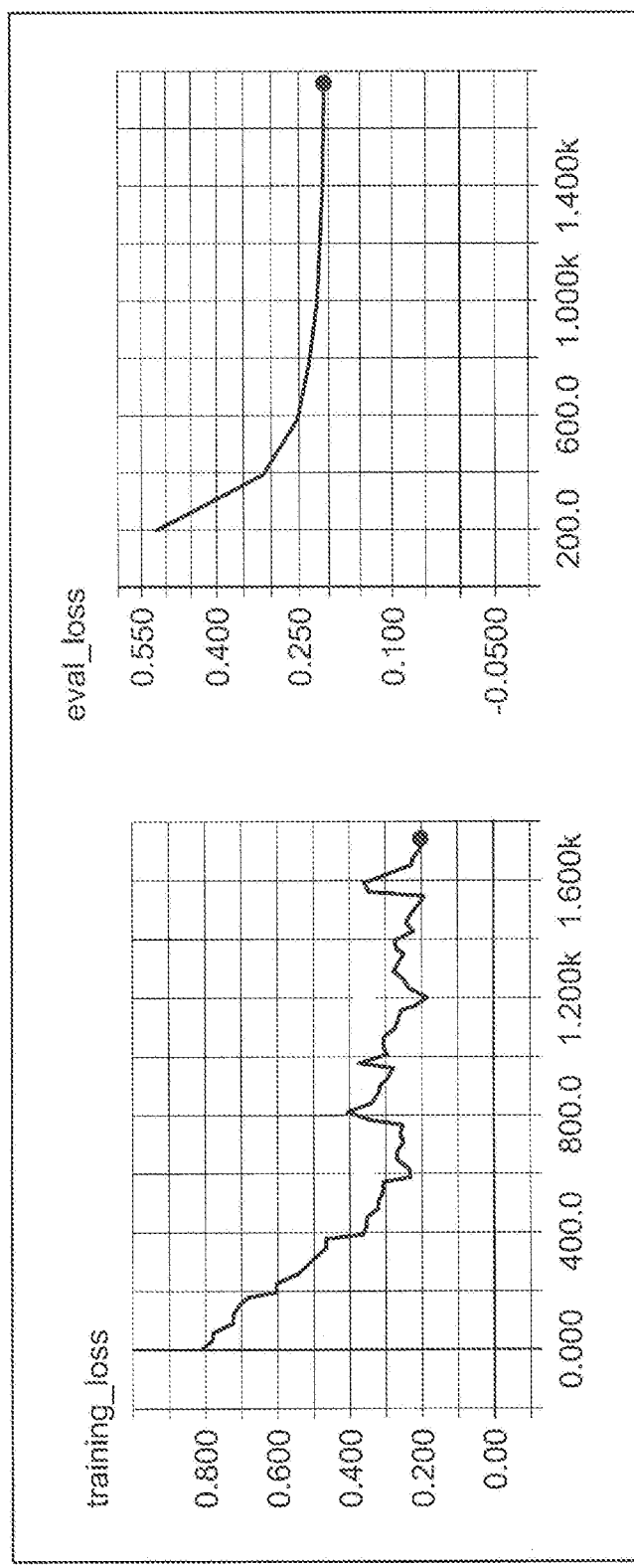
FIG. 4 shows training and validation test results for one implementation of the present invention.
Figure 5:
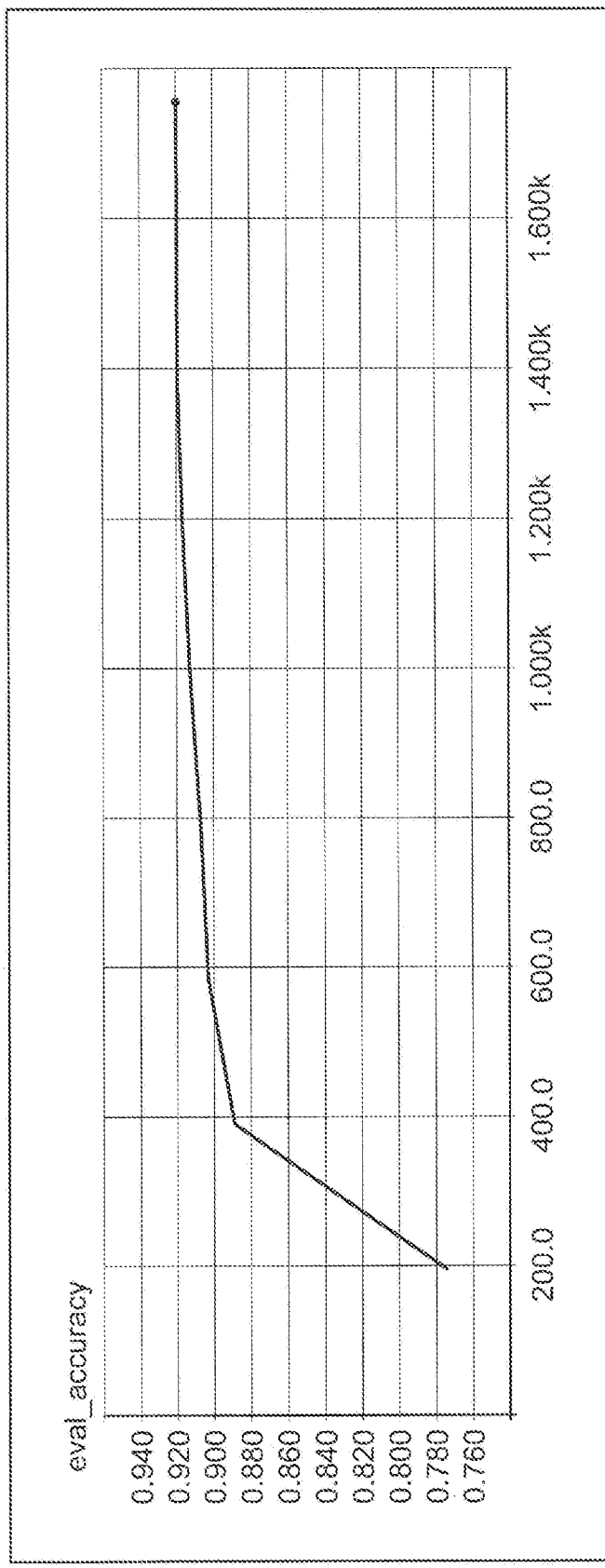
FIG. 5 shows the validation accuracy data related to FIG. 4.

FIG. 4 shows the training and validation at each step in one such iteration, and FIG. 5 shows the validation accuracy at each step for the same iteration.

4. SYSTEM ARCHITECTURE AND FLOWCHARTS

Figure 6:
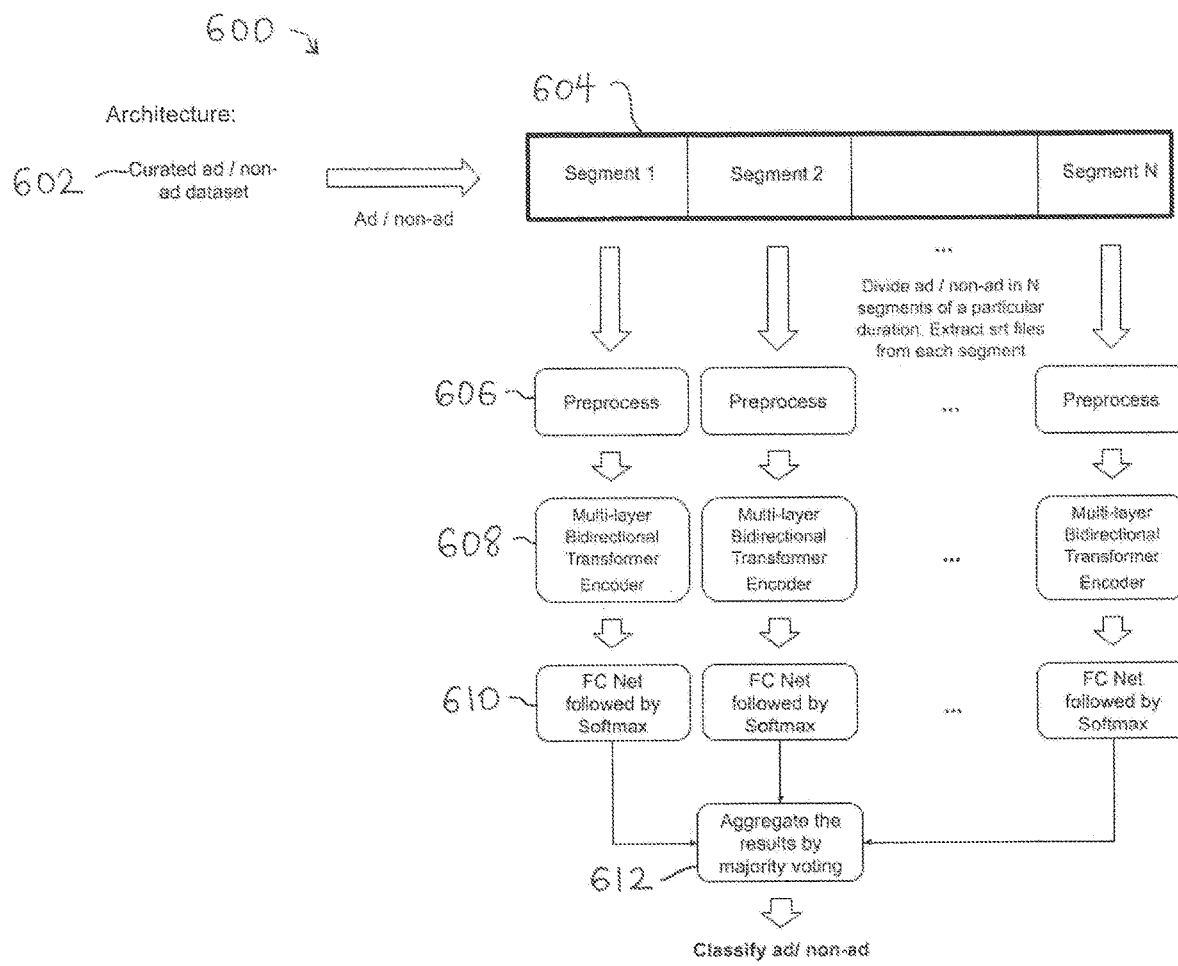
FIG. 6 illustrates system architecture for one preferred embodiment of the present invention.
Figure 7:
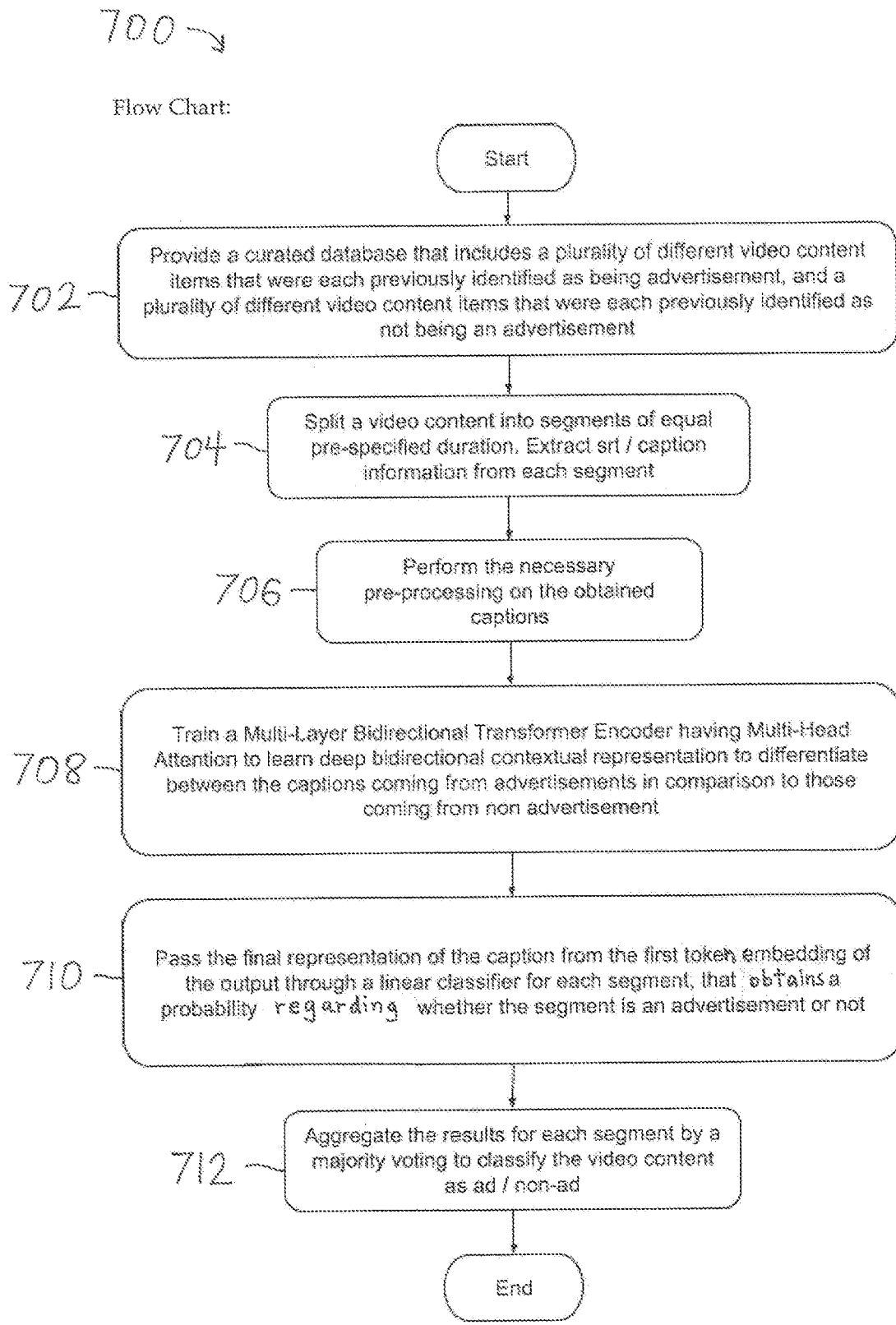

FIG. 6 shows system architecture 600 in accordance with one preferred embodiment of the present invention, and FIG. 7 shows a corresponding flowchart 700 of the training steps associated with this embodiment. For convenience, the elements of FIG. 6 are described in conjunction with the steps of FIG. 7.

Step 702: Provide a curated database that includes a plurality of different video content items that were each previously identified as being an advertisement, and a plurality of different video content items that were each previously identified as not being an advertisement (element 602 of FIG. 6).

A large (huge) dataset of curated ads and non-ads (TV video segments) are inputted into the system architecture 600. This large dataset of TV video segments is curated for training, validation, and testing. The selection and curation process involve creating a balanced dataset of ads and non-ads, and aims to maintain the true distribution within each class. Towards this goal, ads and non-ads are sampled from a wide variety of networks and channels so that the model could learn from diverse examples and generalize across networks. The samples were collected at different times of the day, across different shows and genres for several months. Better generalization means a classifier does well in any dataset and not just the one it is trained with. TV streams across different channels can have different resolution, average frame rate, video data rate, compression settings, and other variables. Sampling from multiple networks also ensures that the true distribution of ads with these different attributes is closely approximated.

The selection and curation process are performed so as to ensure that no systemic biases between ads and non-ads were prevalent, so that the model would be able to learn meaningful differences between the two classes. In order to do so, both ads and non-ads were collected from the same set of TV-stream/networks. That is, when some ads were collected from a particular TV-stream or channel, non-ads were also collected from the same source. This keeps the distribution of different attributes similar for both ads and non-ads. The samples were further curated within each channel so that the different genres, shows and content were adequately represented. Samples collected were manually clipped and labeled as ads and non-ads and validated by different human members of a work team.

Step 704: Split a video content into segments of equal pre-specified duration. Extract srt/caption information from each segment (604 in FIG. 6).

Step 706: Perform any necessary preprocessing on the obtained captions (606 in FIG. 6). See the discussion above regarding some common text cleaning techniques used for preprocessing.

Step 708: Train a Multi-Layer Bidirectional Transformer Encoder having Multi-Head Attention to learn deep bidirectional contextual representation to differentiate between the captions coming from advertisements in comparison to those coming from non-advertisements (element 608 in FIG. 6).

Step 710: Pass the final representation of the caption from the first token embedding of the output through a linear classifier for each segment to obtain a probability regarding whether the segment is an advertisement or not (element 610 in FIG. 5 wherein the classifier is a softmax function that outputs a softmax probability that a clip is an ad or a non-ad, also interchangeably referred to herein as a "softmax classifier"). That is, the linear classifier outputs a probability that the video content should be classified as an ad or a non-ad. More specifically, a separate probability is output for each segment of the clip.

Step 712: Aggregate the results for each segment by a majority voting to classify the video content as ad/non-ad (element 712 in FIG. 5).

FIG. 8 is a flowchart 800 of another preferred embodiment of the present invention. More specifically, FIG. 8 shows the steps of a computer-implemented method for building a model to classify whether video content is likely to be an advertisement, wherein the video content includes a plurality of image frames. In one preferred embodiment, the method of FIG. 8 is implemented, in part, with the elements of FIG. 6. The method of FIG. 8 also shares certain similar steps with the method of FIG. 7. The method of FIG. 8 operates as follows:

Step 802: Provide a curated database of video content items that includes (i) a plurality of different video content items that were each previously identified as being an advertisement, and (ii) a plurality of different video content items that were each previously identified as not being an advertisement.

Step 804: Split each of the video content items into a plurality of segments, each segment having a pre-specified duration.

Step 806: Extract subtitle text information from each segment.

Step 808: Train a natural language processing (NLP) language model (also, referred to interchangeably as a "NLP model") to differentiate between subtitle text information from video content items that were each previously identified as being an advertisement in comparison to subtitle text information from video content items that were each previously identified as not being an advertisement.

Step 810: Pass the subtitle text information for each segment through the NLP language model to extract an embedding representing the subtitle text information for each of the segments.

Step 812: Pass the embedding representing the subtitle text information for each of the segments through a classifier to obtain a probability regarding whether each segment of the video content is an advertisement or not. One suitable classifier is a softmax function that outputs a softmax probability.

Figure 9:
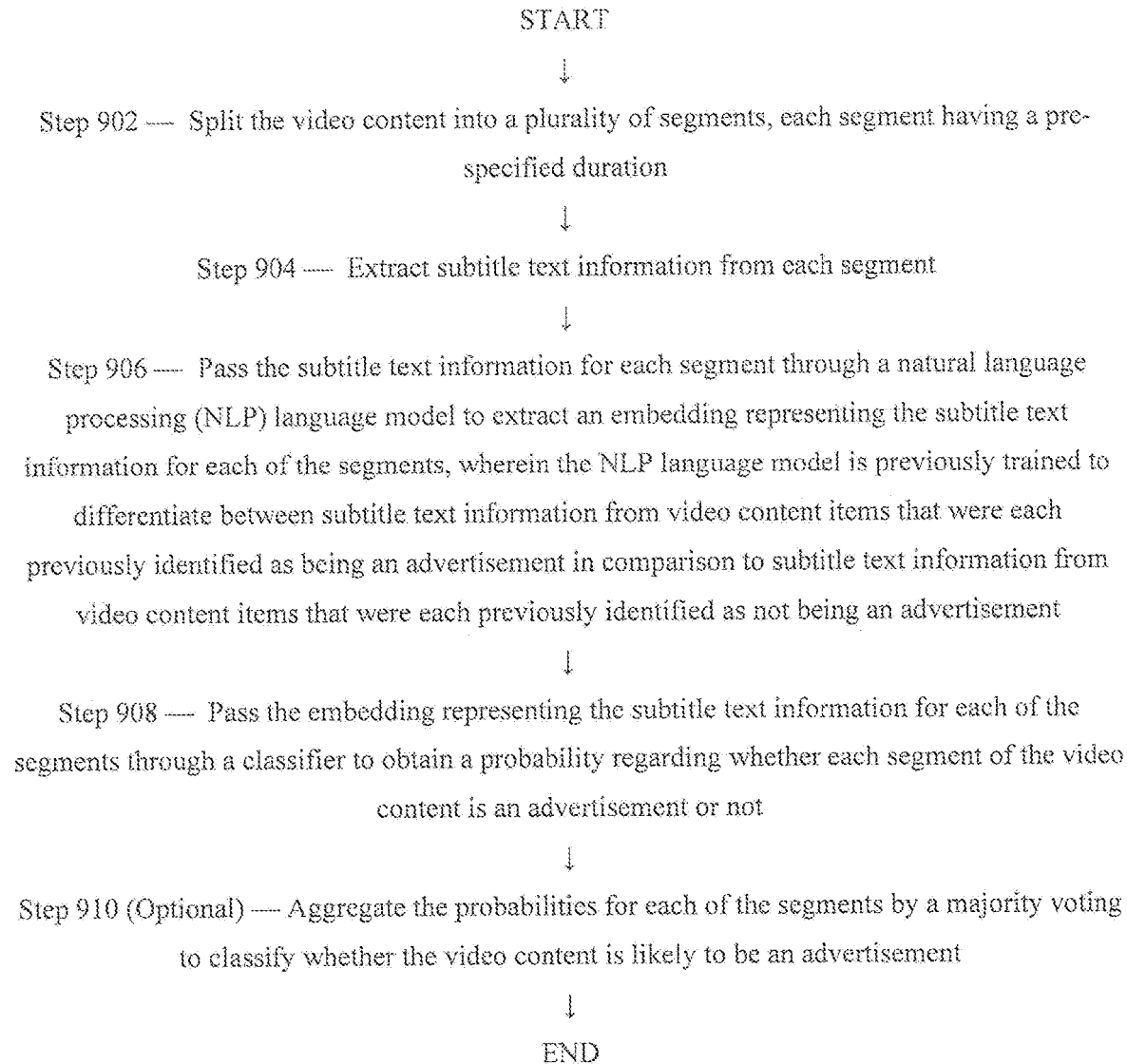

FIG. 9 is a flowchart 900 of another preferred embodiment of the present invention. More specifically, FIG. 9 shows the steps of a computer-implemented method for identifying whether video content is likely to include an advertisement, the video content including a plurality of image frames. In one preferred embodiment, the method of FIG. 9 is also implemented, in part, with the elements of FIG. 6. The method of FIG. 9 also shares certain similar steps with the method of FIG. 7. The method of FIG. 9 operates as follows:

Step 902: Split the video content into a plurality of segments, each segment having a pre-specified duration.

Step 904: Extract subtitle text information from each segment.

Step 906: Pass the subtitle text information for each segment through a natural language processing (NLP) language model to extract an embedding representing the subtitle text information for each of the segments, wherein the NLP language model is previously trained to differentiate between subtitle text information from video content items that were each previously identified as being an advertisement in comparison to subtitle text information from video content items that were each previously identified as not being an advertisement.

Step 908: Pass the embedding representing the subtitle text information for each of the segments through a classifier to obtain a probability regarding whether each segment of the video content is an advertisement or not. One suitable classifier is a softmax function that outputs a softmax probability.

Step 910 (Optional): Aggregate the probabilities for each of the segments by a majority voting to classify whether the video content is likely to be an advertisement.

5. ADDITIONAL CONSIDERATIONS

To further enhance the accuracy of the processes described above, the model results may be compared with results obtained by a video-based ad detection model, such as the model described in U.S. Pat. No. 10,706,286 (Muhamed et al.), which is incorporated by reference herein, and the results of the two models may be used to assist in making the classifications.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer-implemented method for building a model to classify whether video content is likely to be an advertisement, the video content including a plurality of image frames, the method comprising:
   (a) providing a curated database of video content items that includes (i) a plurality of different video content items that were each previously identified as being an advertisement, and (ii) a plurality of different video content items that were each previously identified as not being an advertisement;
   (b) splitting each of the video content items into a plurality of segments, each segment having a pre-specified duration;
   (c) extracting subtitle text information from each segment;
   (d) training a natural language processing (NLP) language model to differentiate between subtitle text information from video content items that were each previously identified as being an advertisement in comparison to subtitle text information from video content items that were each previously identified as not being an advertisement;
   (e) passing the subtitle text information for each segment through the NLP language model to extract an embedding representing the subtitle text information for each of the segments; and
   (f) passing the embedding representing the subtitle text information for each of the segments through a classifier to obtain a probability regarding whether each segment is an advertisement or not.

2. The method of claim 1 further comprising:
   (g) aggregating the probabilities for each of the segments by a majority voting to classify whether the video content is likely to be an advertisement.

3. The method of claim 1 wherein the video content items that were previously identified as being an advertisement are split into segments of 15 seconds, and the video content items that were previously identified as not being an advertisement are split into segments of 10-15 seconds.

4. The method of claim 1 wherein the classifier is a softmax function that outputs a softmax probability.

5. A computer-implemented method for identifying whether video content is likely to include an advertisement, the video content including a plurality of image frames, the method comprising:
   (a) splitting the video content into a plurality of segments, each segment having a pre-specified duration;
   (b) extracting subtitle text information from each segment;
   (c) passing the subtitle text information for each segment through a natural language processing (NLP) language model to extract an embedding representing the subtitle text information for each of the segments, wherein the NLP language model is previously trained to differentiate between subtitle text information from video content items that were each previously identified as being an advertisement in comparison to subtitle text information from video content items that were each previously identified as not being an advertisement; and
   (d) passing the embedding representing the subtitle text information for each of the segments through a classifier to obtain a probability regarding whether each segment is an advertisement or not.

6. The method of claim 5 further comprising:
   (e) aggregating the probabilities for each of the segments by a majority voting to classify whether the video content is likely to be an advertisement.

7. The method of claim 5 wherein the video content items that were previously identified as being an advertisement are split into segments of 15 seconds, and the video content items that were previously identified as not being an advertisement are split into segments of 10-15 seconds.

8. The method of claim 5 wherein the classifier is a softmax function that outputs a softmax probability.

* * * * *